(12) United States Patent
Ortiz et al.

(10) Patent No.: US 8,594,572 B1
(45) Date of Patent: Nov. 26, 2013

(54) WIRELESS ELECTRIC POWER TRANSMISSION THROUGH WALL

(75) Inventors: Albert Ortiz, Chalfont, PA (US); Donald D. Dalessandro, Williamstown, NJ (US); John M. Roach, Herriman, UT (US); Donald R. Longo, Pittsgrove, NJ (US); Qing Dong, Birdsboro, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 208 days.

(21) Appl. No.: 13/161,652

(22) Filed: Jun. 16, 2011

(51) Int. Cl.
*H04B 7/00* (2006.01)
(52) U.S. Cl.
USPC ....... 455/41.2; 455/41.1; 455/41.3; 455/3.06; 455/7; 455/11.1; 455/254; 455/127.2; 455/571; 455/127.5; 455/522; 307/104; 307/149; 307/39; 307/46; 307/48; 367/2; 367/82; 367/128
(58) Field of Classification Search
USPC .................. 455/41.1–41.3, 3.06, 7, 11.1, 254, 455/127.2, 571, 127.5, 522; 307/104, 149, 307/39, 46, 48, 56, 62, 80; 367/2, 82, 128
See application file for complete search history.

(56) References Cited

U.S. PATENT DOCUMENTS

| 5,486,830 | A | * | 1/1996 | Axline et al. | 342/43 |
| 5,594,454 | A | * | 1/1997 | Devereux et al. | 342/357.395 |
| 5,905,943 | A | * | 5/1999 | Wiedeman et al. | 455/11.1 |
| 5,970,400 | A | * | 10/1999 | Dwyer | 455/254 |
| 5,987,613 | A | * | 11/1999 | Busch et al. | 713/300 |
| 7,408,290 | B2 | | 8/2008 | May et al. | |
| 7,760,585 | B1 | * | 7/2010 | Ortiz et al. | 367/2 |
| 2008/0152172 | A1 | | 6/2008 | Matsuzawa | |
| 2009/0127937 | A1 | * | 5/2009 | Widmer et al. | 307/149 |
| 2009/0284245 | A1 | * | 11/2009 | Kirby et al. | 323/318 |

* cited by examiner

*Primary Examiner* — Ping Hsieh
*Assistant Examiner* — Ganiyu A Hanidu
(74) *Attorney, Agent, or Firm* — David A. Ghatt

(57) ABSTRACT

An apparatus for wirelessly transmitting electric currents walls. The walls may be bulkhead compartment walls of a fixed structure or a vehicle or the like. The apparatus includes a wireless electric power transmission arrangement that includes an electronic device on one side of a wall, which is powered by a power source on another side of the wall. The electronic device may be a sensor arrangement having one or more sensors, a battery charging device, a through-the-bulkhead repeater device or other electronic device requiring power.

19 Claims, 3 Drawing Sheets

FIG. 1
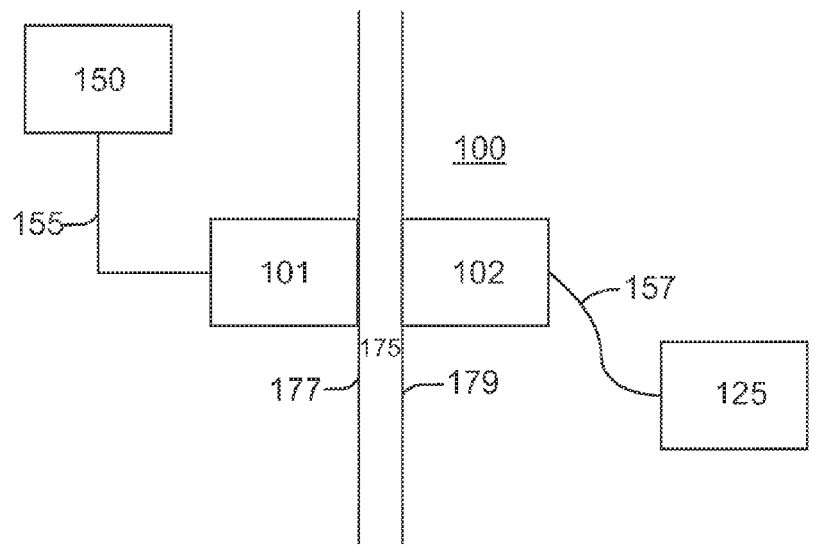
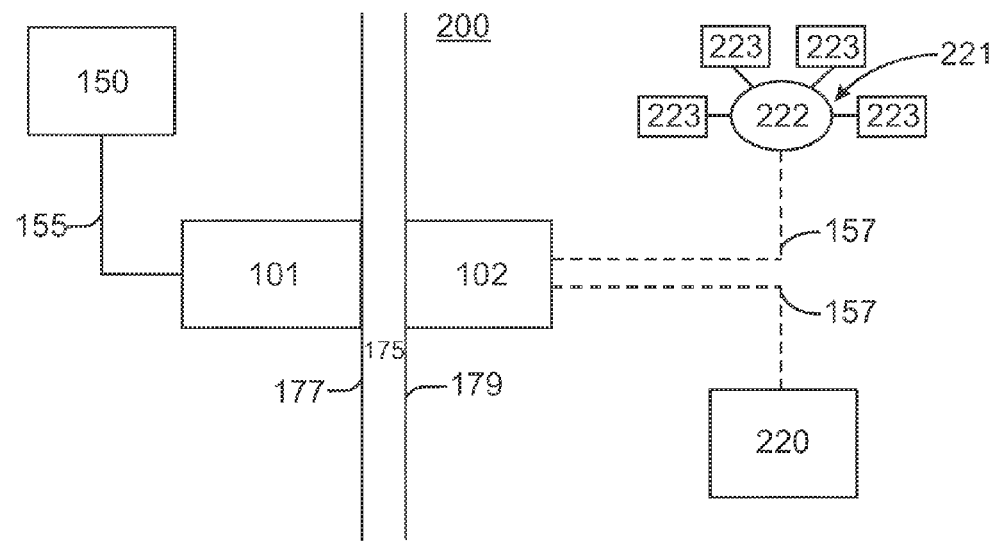
FIG. 2

WIRELESS ELECTRIC POWER TRANSMISSION THROUGH WALL

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

CROSS-REFERENCE TO RELATED APPLICATIONS

This application is related to U.S. nonprovisional patent application Ser. No. 11/906,800, filing date 26 Jun. 2007, now U.S. Pat. No. 7,760,585, incorporated herein by reference, entitled "Through The Bulkhead Repeater" by inventors Albert Ortiz, Donald Dalessandro, and Qing Dong.

TECHNICAL FIELD

The present invention relates generally to an arrangement for providing wireless electric power transmission, more particularly the invention is directed to the use of an arrangement for providing wireless electric power transmission through thick-walled bulkheads and compartments on vessels or structures having sectional compartments.

BACKGROUND

Vessels such as, ships, submarines, and space shuttles, typically include bulkhead structures that divide functional areas into sections, and also provide structural support for the vessel. These sections may be used as watertight or airtight compartments. Regarding water vessels, these compartments can contain water in instances where there is a leak or some sort of hull breach. The sections may also be used as fireproofed compartments for preventing the spread of smoke and fire. In order to provide these safety functions, the compartments typically comprise thick steel walls.

Reduced manning initiatives for these compartmentalized vessels require highly automated systems for operation. A wireless communication system, as outlined in U.S. Pat. No. 7,760,585 by the inventors of the present application, provides the capability of transmitting RF signals through a steel bulkhead of a water vessel utilizing multiple active or passive modal devices (piezoelectric, magnetic, acoustic, and ultrasonic transducers). The capability of directly transmitting an RF signal from one steel compartment to another, permits the reconfiguring of critical control system information for mission essential tasks. It is also desired to have wireless communications arrangements that accommodate for the thick compartment walls and properly transmit electrical power through bulkhead compartments, without physical penetration of the bulkhead. There are labor and material costs associated with the penetration of the bulkhead. Additionally, the bulkhead may be weakened structurally in the vicinity of a penetration if not reinforced.

Thus, the ability to provide power wirelessly in a direct manner for sensors and critical controls, for example, would be beneficial to the overall operations of the compartmentalized vessels. This would be particularly beneficial in situations in compartments in which wires and the like are undesired. Wireless transmission of power would also be beneficial to non-vehicular compartmentalized structures. For example, some manufacturing plants include compartmentalized structures having compartments that are substantially inaccessible in a manner similar to bulkhead compartments outlined above. Similarly, some containers may also be compartmentalized, having sections that benefit from wireless power transmission.

SUMMARY

In one aspect, the invention is a through-the-wall wireless power transmission arrangement. The arrangement has at least one wall having a first side and a second side, with a first power transmission unit associated with the first side of the wall for transmitting electrical energy through the wall. In this aspect, the first power transmission unit includes a power source, a first power transducer, and a first power line electrically connecting the power source to the first power line. The first power transducer receives an electric current from the power source and converts the current into a first energy form and propagates said first energy form through the wall from the first side of the wall to the second side of the wall, using the wall as a conductor. The through-the-wall wireless power transmission arrangement further includes a second power transmission unit associated with the second side of the wall for receiving and propagating the energy form. The second power transmission unit includes a second power transducer, wherein the second power transducer receives said first energy form, and converts said first energy form back into an electric current. The second power transducer propagates the electric current. The through-the-wall wireless power transmission arrangement further includes a second power line attached to the second power transducer, the second power line receiving the electric current from the second power transducer. Also included is an electronic device attached to the second power line, wherein the second power line directs the electric current to the electronic device, thereby powering the electronic device.

In another aspect the invention is a structure having a plurality of compartments wherein the plurality of compartments have one or more powered compartments and one or more unpowered compartments. In this structure, each compartment is arranged adjacent to at least one other compartment, with each compartment comprising a plurality of walls with one or more of the plurality of walls separating adjacent compartments from each other. In this structure, at least one said wall has a first side in a powered compartment and a second side in an unpowered compartment, with a first power transmission unit associated with the first side of the wall for transmitting electrical energy through the wall. In this aspect, the first power transmission unit includes a power source, a first power transducer, and a first power line electrically connecting the power source to the first power line. The first power transducer receives an electric current from the power source and converts the current into a first energy form and then propagates the first energy form through the wall from the first side of the wall in the powered compartment to the second side of the wall in the unpowered compartment, using the wall as a conductor. In this structure a second power transmission unit is associated with the second side of the at least one said wall for receiving and propagating the energy form. The second power transmission unit includes a second power transducer, wherein the second power transducer receives said first energy form, and converts said first energy form back into an electric current, the second power transducer propagating the electric current. A second power line is attached to the second power transducer, the second power line receiving the electric current from the second power transducer. The structure further includes an electronic device within the unpowered compartment, the electronic device attached to the second power line, wherein the second power line directs the electric current to the electronic device, thereby powering the electronic device.

BRIEF DESCRIPTION OF THE DRAWINGS

Other features will be apparent from the description, the drawings, and the claims.

FIG. 1 is a schematic illustration of a wireless electric power transmission arrangement according to an embodiment of the invention.

FIG. 2 is a schematic illustration of a wireless electric power transmission arrangement powering one or more electronic devices, according to an embodiment of the invention.

DETAILED DESCRIPTION

Figure 3:
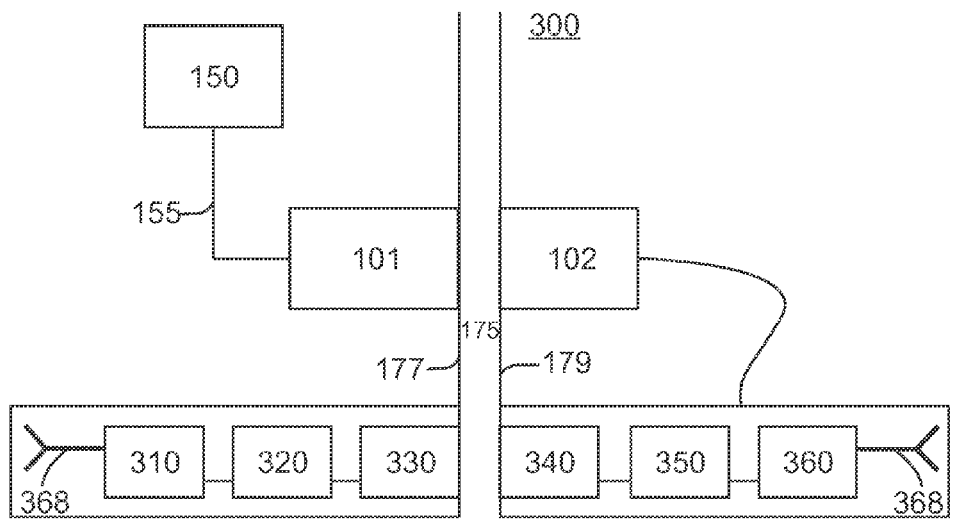
FIG. 3 is a schematic illustration of a wireless electric power transmission arrangement powering a through-the-bulkhead repeater arrangement, according to an embodiment of the invention.

FIG. 1 is a schematic illustration of a wireless electric power transmission arrangement 100 according to an embodiment of the invention. The arrangement 100 is provided to transmit electrical power, wirelessly, from a first side 177 of a wall 175 to the second side 179 of the wall 175. As outlined below, the wall 175 may separate a first powered compartment from a second unpowered compartment, and the arrangement 100 allowing power to be transmitted from the powered compartment to the unpowered compartment.

As shown in FIG. 1, the wireless electric power transmission arrangement 100 is located on either side of the wall 175. The wall 175 may preferably be a conductor material such as steel, iron, aluminum, titanium, and combinations thereof, or the like, depending on the application. For example if the wall 175 is a bulkhead wall of a ship, the wall may be steel, iron, aluminum, or combinations thereof. If the wall 175 is a bulkhead wall of a submarine, it may be titanium or the like. The wall thickness may be any desired thickness depending on the application. For example, if the wall 175 is a bulkhead wall for a watertight application in a ship, the wall may be about 0.20 inches to about 1.0 inch thick.

FIG. 1 shows a first power transducer 101 on the first side 177 of the wall 175. FIG. 1 also shows a power source 150 which is attached to the first power transducer 101 via a first power transmission line 155. The power source may be a 120 VAC, 450 VAC, 4160 VAC (3 phase 60 hz), 375 VDC, 650 VDC, or the like. The first power transducer 101 may be a signal processor that converts an electrical current into an energy form, such as ultrasonic, magnetic, or acoustic energy.

The wireless power transmission arrangement 100 further includes a second power transducer 102 on the second side 179 of the wall 175. FIG. 1 also shows an electronic device 125, which is attached to the second power transducer 102 via a second power transmission line 157. The second power transducer 102 may be a signal processor that converts energy forms such as ultrasonic, magnetic, or acoustic energy into an electrical current. The electronic device 125 may then receive the converted electrical current via the second power transmission line 157. The electronic device 120 may be any type of electronic device that requires an electric current in order to operate. As outlined below, the electronic device 125 may be for example, a battery charger, a sensor arrangement having one or more sensors, or a through-the-bulkhead repeater arrangement. To optimize the efficiency of the arrangement 100, the first power transducer 101 and the second power transducer 102 are attached to respective sides of the walls 177 and 179 at substantially identical horizontal and vertical orientations. The transducers 101 and 102 may be attached to the wall 175 by means of adhesives, suction devices, magnetic devices, or other known non-invasive attaching means.

In operation, the power source 150 directs an electric current to the first power transducer 101, via the power transmission line 155. The electric current is received by the transducer 101 and is converted into an energy form that is propagated from the first side 177 of the wall 175 to the second side 179 of the wall 175. In one particular embodiment, the transducer 101 is an ultrasonic system that is structured to convert the electric current into an ultrasonic wave that is transmitted through the wall 175, with the wall acting as a conductor, conducting the ultrasonic wave from the first side 177 to the second side 179 of the wall 175. According to other embodiments, the first transducer 101 may be structured to convert the electric current into magnetic energy or acoustic energy On the second side 179 of the wall 175, the second power transducer 102 receives the transmitted energy form and converts the energy form into an electric current. According to the ultrasonic system embodiment, ultrasonic energy is transmitted through the wall 175 and received by the second power transducer 102. According to this embodiment of an ultrasonic system, the transducer 102 is structured to convert the ultrasonic energy into an electric current. The ultrasonic system is designed for transmission through mild steel on the order of fractions of an inch, such as for example a wall 175 having a thickness of about 0.5 inches. According to this embodiment, an electric current carrying as much as about 5 volts DC, 250 milliamps, may be transmitted through to the second side of the wall 179. This current represents a transmission efficiency of at least 60%.

According to other embodiments, the transducer 102 may be structured to convert acoustic or magnetic energy into an electric current. After the transducer 102 converts the energy type into an electric current, the electric current is used to power the electronic device 120. According to other embodiment, the transducers 101 and 102 may be connected to an interface circuit, located in a modem, and the interface circuit may be ultrasonic, magnetic, or piezoelectric for example.

The electronic device 125 may be any desired electronic device. For example, the electronic device may be a battery charger or a sensor arrangement having one or more sensors. FIG. 2 is a schematic illustration of a wireless electric power transmission arrangement similar to that of the illustration of FIG. 1. In the FIG. 2 embodiment, the wireless electric power transmission arrangement 200 is provided to power one or more electronic devices. As shown, the power transmission arrangement 200 may power electronic device 220, which may be a battery charger, and/or electronic device 221, which may be a sensor controller arrangement, having one or more sensors. As shown, the sensor controller arrangement includes a controller 222 for controlling and monitoring the operation of the one or more sensors 223. Depending on the application, the one or more sensors 223 may include water sensors, flooding sensors, humidity sensors, pressure sensors, temperature sensors, smoke sensors, explosive and poisonous gas sensors, carbon monoxide sensors, chlorine gas sensors, nitrogen sensors, and infrared sensors.

According to the embodiment of FIG. 2, the converted electric current may be used to power either electronic device 220 or electronic device 221, or the converted electric current may be provided simultaneously to both electronic devices 220 and 221, via one or more power transmission lines 157. The dotted lines indicate that each power line 157 may optionally be included, depending on the requirements of the system. It should be noted that throughout this written description, like elements carry the same alpha-numeric reference numbers. Thus for example, the transducers 102 of FIGS. 1 and 2 are identical and provide similar functions. Additionally, apart from providing an electric current to one or more electronic devices, the power transmission arrangement 200 operates almost identically to the wireless power transmission arrangement 100.

FIG. 3 is a schematic illustration of a wireless electric power transmission arrangement 300 powering an electronic device. According to this embodiment, the electronic device may be one or more elements of the through-the-bulkhead repeater arrangement 305. As outlined above, like elements carry the same alpha-numeric reference numbers. Thus for example, the transducers 102 of FIGS. 1 and 3 are identical and provide similar functions. Additionally, the operation of the arrangement 300 is also similar to the operation of the wireless electric power transmission arrangement 100, described above.

According to the embodiment of FIG. 3, the through-the-bulkhead repeater arrangement 305 is provided to transmit radio frequency signals, and information carried by the radio frequency signals, through the wall 175. The repeater arrangement 305 is located on either side of the wall 175. The arrangement 305 comprises a first bi-directional data transmission unit 301 and a second bi-directional data transmission unit 302. The first bi-directional unit 301 is positioned on the first side 177 of the wall 175, and includes a transceiver 310, and an antenna 308 associated with the transceiver 310. The antenna 308 may comprise one or more antennae elements for sending and receiving radio frequency signals. The first bi-directional data transmission unit 301 further includes a bi-directional converter 320 and a bi-directional transducer 330. The elements of the first bi-directional data transmission unit 301 may be hard-wired and packaged as a single device on an integrated circuit board or the like. The first bi-directional unit 301 may be secured to the first side of the wall 177 by using known adhesives and/or attachment devices, such as screws, bolts, and the like.

As shown in FIG. 3, in the arrangement 300, the second bi-directional data transmission unit 302 is located on the second side 179 of the wall 175. The structure of the second bi-directional data transmission unit 302 is similar to that of the first bi-directional data transmission unit 301. The second bi-directional unit 302 includes a transceiver 360, and an antenna 368 associated with the transceiver 360, a bi-directional converter 350, and a bi-directional transducer 340. Similar to the first unit 301, the elements of the second bi-directional unit 302 may be hard-wired and packaged as a single device on an integrated circuit board or the like. The unit 302 is preferably mounted on the second side 179 of the bulkhead wall 175 horizontally and vertically aligned with unit 301, and may be attached to the wall by using known adhesives and/or attachment devices, such as screws, bolts, and the like.

In operation, the transceiver 310 of the first bi-directional data transmission unit 301 receives an incoming radio frequency signal via the antenna 308. The transceiver 310 then sends the radio frequency signal to the bi-directional converter 320, which converts the radio frequency signal into an electronic signal. The electronic signal is preferably an acoustic signal such as an ultrasonic signal. The electronic signal may also be a magnetic signal such as an electromagnetic signal. The electronic signal is then fed to the bi-directional transducer 330, and is converted by the transducer into an energy form that is conducted through the bulkhead wall 175. In one particular embodiment, if the electronic signal is an acoustic signal, the transducer 330 converts this signal into an acoustic wave which it transmits through the bulkhead wall 175, the wall acting as a conductor, conducting the signal from the first side 177 to the second side 179.

According to the exemplary operation, the bi-directional transducer 340 senses the energy form that is propagated through the wall 175. It should be noted that this energy form is a second energy form that is different from the first energy form propagated by the wireless electric power transmission arrangement. The first energy form propagated by the wireless electric power transmission arrangement is related to the transmission of an electric current. The second energy form propagated by the through-the-bulkhead arrangement is related to data transmission. According to the embodiment of FIG. 3, transducer 340 then converts the energy form into an electronic signal and sends the electronic signal to the bi-directional converter 350. The bi-directional converter 350, which may be a signal processor that utilizes a controlled oscillator, converts the electronic signal into a radio frequency signal which is then fed to the transceiver 360. The transceiver 360 receives and transmits the signal via antenna 368. These features along with other features of the through-the-bulkhead arrangement are outlined in U.S. Pat. No. 7,760,585, which is hereby incorporated herein by reference.

As described with respect to the arrangement 100 of FIG. 1, the wireless electric power transmission arrangement 300 transmits an electric current wirelessly, from the first side 177 of the wall 175 to the second side of the wall 179. The electric power, initially supplied by the source 150, is converted to an energy form by the first transducer 101, which is then propagated through the wall 175, where the energy form is received by the second transducer and converted back into an electric current. The electric current is then transmitted to one or more elements of the through-the-bulkhead repeater arrangement 305, thereby powering the arrangement 305. FIG. 3 shows a power transmission line 157 for transmitting power to the through-the-bulkhead repeater arrangement 305. The power transmission line is attached at one end to the second power transducer 102, and transmits a converted electrical current to the arrangement 305. As shown, the power line 157 may be attached directly to the bi-directional transducer 340. Alternatively, the power line 157 may be attached to other elements of the through-the-bulkhead arrangement 305, such as the bi-directional converter 350, for example.

Figure 4:
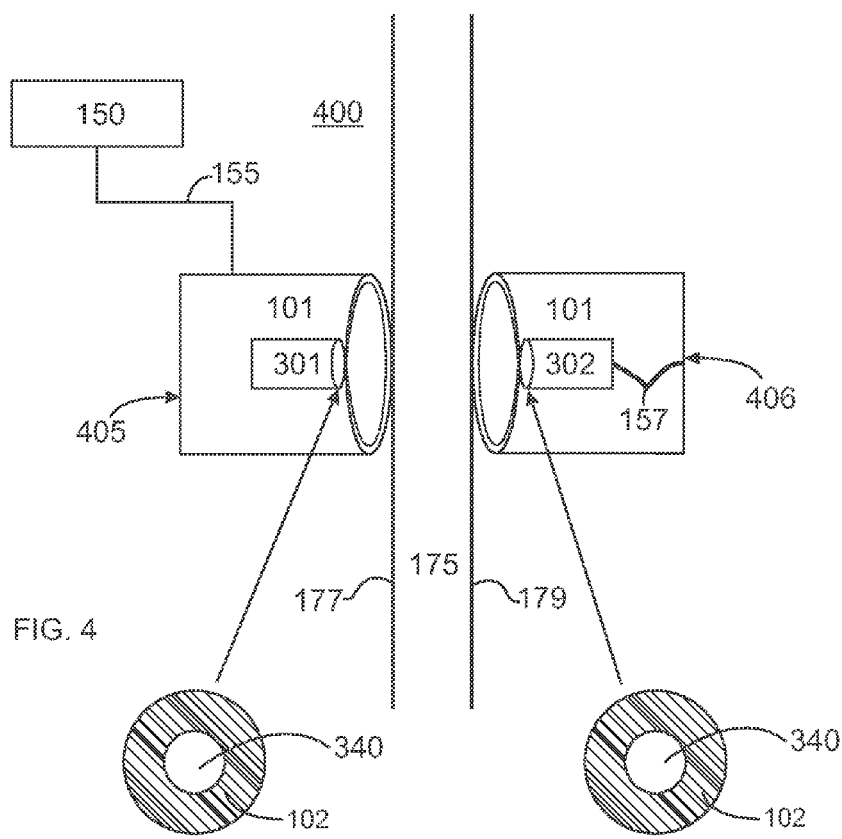
FIG. 4 is a schematic illustration of a wireless electric power transmission arrangement powering a through-the-bulkhead repeater arrangement, according to an embodiment of the invention.

FIG. 4 is a schematic illustration of a wireless electric power transmission arrangement 400 powering a through-the-bulkhead repeater arrangement, according to an embodiment of the invention. The electric power transmission arrangement 400 of FIG. 4 is similar to the arrangement of FIG. 3, and operates substantially identically. As with the arrangement 300 of FIG. 3, the arrangement 400 of FIG. 4 includes a through the bulkhead first power transducer 101 associated with the first side 177 of the wall 175, and a second power transducer 102, associated with the second side 179 of the wall 175. As with the arrangement 300, the electric power transmission arrangement 400 also includes a first bi-directional unit 301 having a bi-directional transducer 330 associated with the first side 177 of the wall 175, and a second bi-directional unit 302 having a bi-directional transducer 340, associated with the second side 179 of the wall 175. However, in the wireless electric power transmission arrangement 400, the first power transducer 101 and the first bi-directional unit 301 are packaged in a single housing 405, and the second power transducer 102 and the second bi-directional unit 302 are packaged in a single housing 406. As shown in FIG. 4, within the housing 405, the transducers 101 and 330 may be formed in a concentric arrangement with the bi-lateral transducer 330 within the first power transducer 101. Similarly, within the housing 406, the transducers 102 and 340 may be formed in a concentric arrangement with the bi-lateral transducer 340 with the second power transducer 102.

To optimize the operation of the wireless electrical power transmission arrangement 400, the housings 405 and 406 are mounted on the respective sides of the wall 175 in matching horizontal and vertical orientations. More specifically, the concentric transducer structures (101, 330) and (102, 340) are positioned in matching opposing horizontal and vertical orientations. According to an embodiment of the concentric transducer structures (101, 330) and (102, 340) may be circular. Alternatively, the concentric transducer structures (101, 330) and (102, 340) may be oval, or other shapes.

As stated above, the operation of the wireless electric power transmission arrangement 400 of FIG. 4 is substantially identical to the operation of the wireless electric power transmission arrangement 300 of FIG. 3. Thus, the wireless electric power transmission arrangement 400 transmits an electric current wirelessly, from the first side 177 of the wall 175 to the second side of the wall 179. The electric power, initially supplied by the source 150, is converted to an energy form by the first transducer 101, which is then propagated through the wall 175, where the energy form is received by the second transducer 102 and converted back into an electric current. The electric current is then transmitted to one or more elements of the second bi-directional unit 302, thereby powering the unit 302. The arrangement 400 may include a power transmission line 157 within the housing 406, for transmitting the converted electrical current from the second power transducer 102 to the second bi-directional unit 302 of the through-the-bulkhead repeater.

Figure 5:
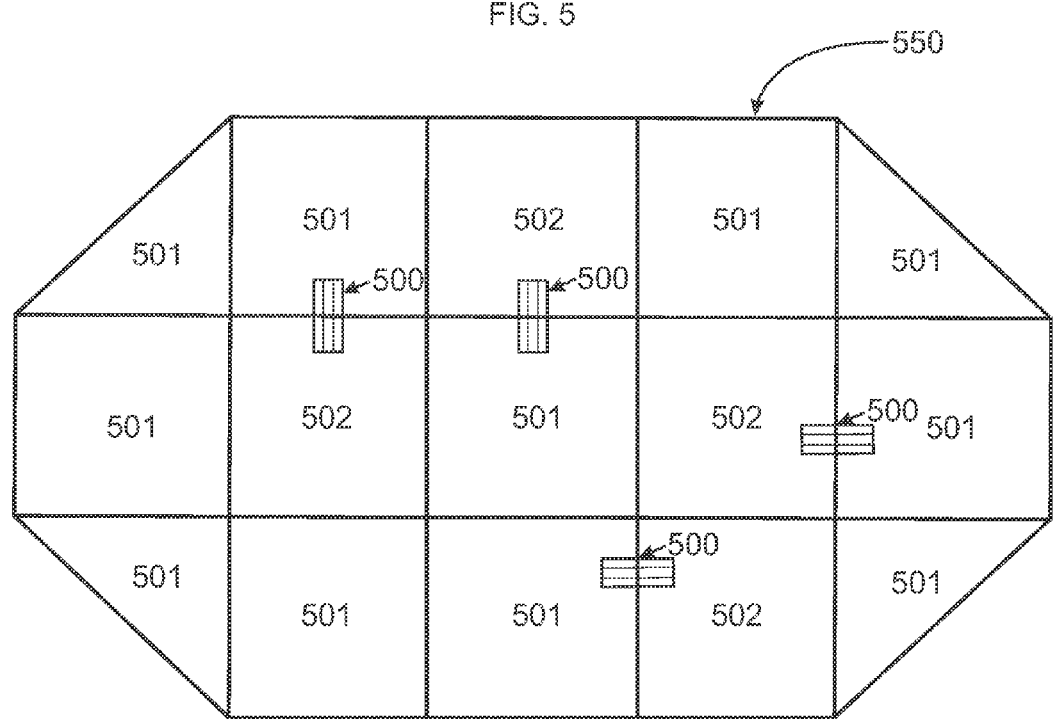
FIG. 5 is a perspective sectional view of a structure having a plurality of wireless electric power transmission arrangements, according to an embodiment of the invention.

FIG. 5 is a perspective sectional view of a structure 550 having a plurality of wireless electric power transmission arrangements 500, according to an embodiment of the invention. FIG. 5 illustrates a plurality of compartments (501, 502) within the structure 550. According to an embodiment of the invention, the structure 550 is a vessel, which may be a ship, a submarine, a space shuttle, or the like, having a plurality of bulkhead walls that divides the vessel into different functional areas.

According to an embodiment of the invention, compartments 501 are powered compartments and 502 are unpowered compartments. As illustrated, each wireless electric power transmission arrangement 500 extends from a powered compartment 501 to an unpowered compartment 502. The arrangement 500 allows for the transmission of power wirelessly from a powered compartment 501 through a bulkhead wall 175 to an unpowered compartment 502.

It should be noted that the electric power transmission arrangement 500 may be any of the wireless electric power transmission arrangements as disclosed in the written description and as illustrated in FIGS. 1, 2, 3, and 4. Therefore, each of the wireless electric power transmission arrangements of FIGS. 1-4 outlined above, may be organized within a structure 550 as illustrated. Thus, for example, the arrangement 500 may be representative of the arrangement 400 illustrated in FIG. 4, which has a first power transducer 101 associated with the first side 177 of the wall 175 in a powered compartment 501, and a second power transducer 102, associated with the second side 179 of the wall 175 in an unpowered compartment 502. According to this embodiment, the electric power transmission arrangement would also include a first bi-directional unit 301 having a bi-directional transducer 330 associated with the first side 177 of the wall 175 in a powered compartment 501, and a second bi-directional unit 302 having a bi-directional transducer 340, associated with the second side 179 of the wall 175 in an unpowered compartment. Additionally the respective elements would be packaged in housings 405 and 406, as outlined above.

Regarding the illustration of FIG. 5, according to another embodiment of the invention, the wireless electric power transmission arrangement 500 may include an electronic device 221 as illustrated in FIG. 2. The electronic device 221 includes a controller 222 and one or more sensors 223. In the compartmentalized structure of FIG. 5, sensors may include water sensors, flooding sensors, humidity sensors, pressure sensors, temperature sensors, smoke sensors, explosive and poisonous gas sensors, carbon monoxide sensors, chlorine gas sensors, nitrogen sensors, and infrared sensors. According to this embodiment electronic device 221 is powered wirelessly in order to provide critical data and control of the compartment conditions, particularly in situations where the compartments are difficult to access.

Alternatively, in the arrangement illustrated in FIG. 5, the wireless electric power transmission arrangements 500 shown may include a mixture of the different arrangements shown in FIGS. 1-4. Thus, for example, the structure 550 may include both the wireless electric power transmission arrangement 200 shown in FIG. 2 and the wireless electric power transmission arrangement 400 shown in FIG. 4.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A through the wall wireless power transmission arrangement, the arrangement comprising:
   at least one wall having a first side and a second side, with a first power transmission unit associated with the first side of the wall for transmitting electrical energy through the wall, the first power transmission unit comprising:
   a power source;
   a first power transducer; and
   a first power line electrically connecting the power source to the first power line, wherein the first power transducer receives an electric current from the power source and converts the current into a first energy form and propagates said first energy form through the wall from the first side of the wall to the second side of the wall, using the wall as a conductor;
   the through the wall wireless power transmission arrangement further comprising a second power transmission unit associated with the second side of the wall for receiving and propagating said energy form, the second power transmission unit comprising:
   a second power transducer, wherein the second power transducer receives said first energy form, and converts said first energy form back into an electric current, the second power transducer propagating said electric current;

a second power line attached to the second power transducer, the second power line receiving the electric current from the second power transducer; and an electronic device attached to the second power line, wherein the second power line directs the electric current to the electronic device, thereby powering the electronic device, wherein the first power transducer is a signal processor that converts the electrical current into ultrasonic energy, and wherein the second power transducer is a signal processor that converts ultrasonic energy into an electrical current.

2. The through the wall wireless power transmission arrangement of claim 1, wherein the at least one wall comprises steel.

3. The through the wall wireless power transmission arrangement of claim 2, wherein the electronic device is a sensor arrangement comprising a controller and one or more sensors, wherein the sensor arrangement is powered by the electric current.

4. The through the wall wireless power transmission arrangement of claim 2, wherein the electronic device comprises a battery charging circuit and a battery connected to the battery charging circuit, wherein the charging circuit utilizes the electric current to charge the battery.

5. The through the wall wireless power transmission arrangement of claim 2, wherein the electronic device comprises:

a second bi-directional data transmission unit for receiving data as a second energy form, said second bi-directional data transmission unit associated with the second side of the wall, said second bi-directional data transmission unit receiving said second energy form at the second side of the wall and converting said second energy form into an output e**put radio frequency data signal.

6. The through the wall wireless power transmission arrangement of claim 5, wherein the electronic device further comprises:

a first bi-directional data transmission unit for transmitting data as a second energy form, said first bi-directional data transmission unit associated with the first side of the wall, said first bi-lateral data transmission unit converting an input radio frequency signal into said second energy form, and transmitting said second energy form from the first side of the wall to the second side of the wall.

7. The through the wall wireless power transmission arrangement of claim 6, wherein the second bi-directional data transmission unit further comprises a second bi-directional transducer, the second bi-directional transducer converting said second energy form into said output radio frequency data output signal, and wherein the first bi-directional data transmission unit further comprises a first bi-directional transducer, the first bi-directional transducer converting said radio frequency data input signal into said second energy form and transmitting said second energy form from the first side of the wall to the second side of the wall where said second bi-directional transducer receives said second energy form.

8. The through the wall wireless power transmission arrangement of claim 7, wherein the power source, the first power transducer, and the first power line are all provided in a single first package, and wherein the second power transducer, the second power line, and the electronic device are all provided in a single second package, and wherein the single first package and the single second package are mounted on first and second sides of the wall respectively, the single first package and the single second package mounted in matching horizontal and vertical orientations to properly align the transducers to maximize transmission between the transducers, and wherein the first bi-directional data transmission unit is provided on a third package on the second side of the wall, and wherein the second bi-directional data transmission unit is provided on a fourth package on the first side of the wall, and wherein the third package and the fourth package are mounted in matching horizontal and vertical orientations to properly align the transducers to maximize transmission between the transducers.

9. The through the wall wireless power transmission arrangement of claim 7, wherein the first power transducer and the first bi-directional transducer form a first concentric arrangement in a single housing package associated with the first side of the wall and wherein the second power transducer and the second bi-directional transducer form a second concentric arrangement in a single housing package associated with the second side of the wall, and the first concentric arrangement and the second concentric arrangement are mounted in matching horizontal and vertical orientations to properly align the transducers to maximize transmission between the transducers.

10. A structure having a plurality of compartments wherein said plurality of compartments comprise one or more powered compartments and one or more unpowered compartments, each compartment arranged adjacent to at least one other compartment, each compartment comprising a plurality of walls with one or more of said plurality of walls separating adjacent compartments from each other, wherein in said structure, at least one said wall has a first side in a powered compartment and a second side in an unpowered compartment, with a first power transmission unit associated with the first side of the wall for transmitting electrical energy through the wall, the first power transmission unit comprising:

a power source;

a first power transducer; and a first power line electrically connecting the power source to the first power line, wherein the first power transducer receives an electric current from the power source and converts the current into a first energy form and propagates said first energy form through the wall from the first side of the wall in the powered compartment to the second side of the wall in the unpowered compartment, using the wall as a conductor;

wherein in said structure a second power transmission unit is associated with the second side of the at least one said wall for receiving and propagating said energy form, the second power transmission unit comprising:

a second power transducer, wherein the second power transducer receives said first energy form, and converts said first energy form back into an electric current, the second power transducer propagating said electric current; and a second power line attached to the second power transducer, the second power line receiving the electric current from the second power transducer;

the structure further including an electronic device within said unpowered compartment, the electronic device attached to the second power line, wherein the second power line directs the electric current to the electronic device, thereby powering the electronic device, wherein the first power transducer is a signal processor that converts the electrical current into ultrasonic energy, and wherein the second power transducer is a signal processor that converts ultrasonic energy into an electrical current.

11. The structure of claim 10 wherein the first power transmission unit and the second power transmission unit are mounted on first and second sides of the at least one said wall respectively, the first transmission unit and the second transmission unit mounted in matching horizontal and vertical orientations to properly align the transducers to optimize transmission between the transducers, and wherein each of the plurality of walls comprise steel.

12. The structure of claim 11, wherein the electronic device is a sensor arrangement comprising a controller and one or more sensors, wherein the sensor arrangement is powered by the electric current.

13. The structure of claim 11, wherein the electronic device comprises a battery charging circuit and a battery connected to the battery charging circuit, wherein the charging circuit utilizes the electric current to charge the battery.

14. The structure of claim 11, wherein the electronic device comprises:
 a second bi-directional data transmission unit for receiving data as a second energy form, said second bi-directional data transmission unit associated with the second side of the wall, said second bi-directional data transmission unit receiving said second energy form at the second side of the wall and converting said second energy form into an output radio frequency data signal; and
 a first bi-directional data transmission unit for transmitting data as a second energy form, said first bi-directional data transmission unit associated with the first side of the wall, said first bi-lateral data transmission unit converting an input radio frequency signal into said second energy form, and transmitting said second energy form from the first side of the wall to the second side of the wall.

15. The structure of claim 14, wherein the second bi-directional data transmission unit further comprises a second bi-directional transducer, the second bi-directional transducer converting said second energy form into said output radio frequency data output signal, and wherein the first bi-directional data transmission unit further comprises a first bi-directional transducer, the first bi-directional transducer converting said radio frequency data input signal into said second energy form and transmitting said second energy form from the first side of the wall to the second side of the wall where said second bi-directional transducer receives said second energy form.

16. The structure of claim 15, wherein the first bi-directional data transmission unit and the second bi-directional data transmission unit are provided on respective first and second sides of the at least one said wall in matching horizontal and vertical orientations to properly align the transducers to optimize transmission between the transducers.

17. The structure of claim 16, wherein the first power transducer and the first hi-directional transducer form a first concentric arrangement in a single housing package associated with the first side of the wall and wherein the second power transducer and the second bi-directional transducer form a second concentric arrangement in a single housing package associated with the second side of the wall, and the first concentric arrangement and the second concentric arrangement are mounted in matching horizontal and vertical orientations to properly align the transducers to maximize transmission between the transducers.

18. The structure of claim 11, wherein the structure is mobile vessel, and wherein the compartment walls are bulkhead walls.

19. The structure of claim 17, wherein the structure is mobile vessel, and wherein the compartment walls are bulkhead walls.

* * * * *